United States Patent
Yamakawa (10) Patent No.: US 7,123,311 B2
(45) Date of Patent: Oct. 17, 2006

(54) PROJECTOR WITH A MICRO LENS ARRAY

(75) Inventor: Hidemasa Yamakawa, Azusagawa-mura (JP)

(73) Assignee: Seiko Epson Corporation, Tokyo (JP)

( * ) Notice: Subject to any disclaimer, the term of this patent is extended or adjusted under 35 U.S.C. 154(b) by 426 days.

(21) Appl. No.: 10/359,135

(22) Filed: Feb. 6, 2003

(65) Prior Publication Data
US 2004/0075778 A1 Apr. 22, 2004

(30) Foreign Application Priority Data
Feb. 14, 2002 (JP) ............................. 2002-037427

(51) Int. Cl.
*H04N 9/31* (2006.01)
(52) U.S. Cl. ..................... 348/744; 348/751
(58) Field of Classification Search ................ 348/744, 348/750, 751, 758, 790, 791, 752–755; 349/7, 349/8, 30; 353/82, 94, 30, 31, 34, 33; H04N 9/31, H04N 9/30
See application file for complete search history.

(56) References Cited

U.S. PATENT DOCUMENTS 6,315,417 B1 * 11/2001 Yajima et al. .............. 353/122

FOREIGN PATENT DOCUMENTS

| JP | A-02-055384 | 2/1990 |
|---|---|---|
| JP | A-04-104244 | 4/1992 |
| JP | A-05-034846 | 2/1993 |
| JP | A-10-333089 | 12/1998 |
| JP | A-2000-131761 | 5/2000 |
| JP | A-2001-255605 | 9/2001 |
| JP | A-2001-290218 | 10/2001 |

* cited by examiner

*Primary Examiner*—Sherrie Hsia
(74) *Attorney, Agent, or Firm*—Oliff & Berridge, PLC (57) ABSTRACT

The present invention is a projector provided with a light source, a color separating optical system for separating the light from the light source into three colored light beams of red, green and blue, a liquid crystal panel for the red color for modulating the red colored light beam, a liquid crystal panel for the green color for modulating the green colored light beam, a liquid crystal panel for the blue color for modulating the blue colored light beam, and a projection lens which projects the light that was modulated by the three liquid crystal panels, wherein only the liquid crystal panel for the red color is provided with a micro lens from among the three liquid crystal panels. In this configuration, the color balance of the color image is improved and the color reproducibility (color matching) as a whole is improved, and the projector of the present invention is suitable for use as a projector for projecting a color image onto a projection surface such as a screen.

9 Claims, 8 Drawing Sheets

PROJECTOR WITH A MICRO LENS ARRAY

FIELD OF THE INVENTION

The present invention relates to a projector for projecting a color image onto a screen or so forth.

BACKGROUND TECHNOLOGY

Figure 7:
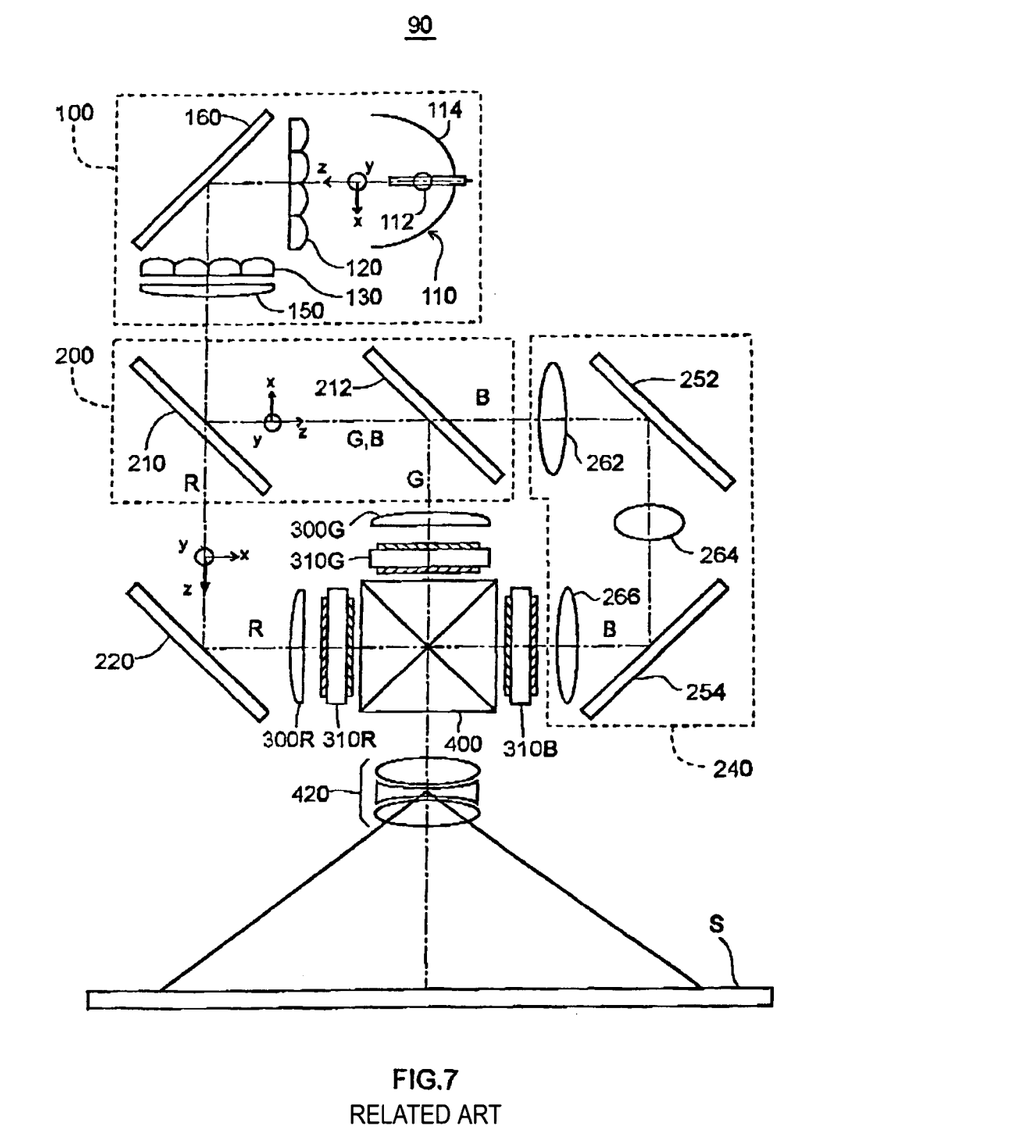
FIG. 7 is a drawing that shows the optical system of a conventional projector.

FIG. 7 is a diagram showing the optical system of a conventional projector. As can be seen in FIG. 7 this projector 90 is provided with an illumination optical system 100, a color separating optical system 200, a relay optical system 240, a reflecting mirror 20, two field lenses 300R and 300G, three liquid crystal panels 310S, 310G, and 310B, a dichroic prism 400, and a projection lens 420. The color separating optical system 200 has dichroic mirrors 210 and 212. The relay optical system 240 has reflecting mirrors 252 and 254, an incident side lens 262, a relay lens 264, and a field lens 266.

The projector 90 separates the light that exits from the light source 110 into the three colors of light red, green, and blue by means of the color separating optical system 200. Then each of the three colored light beams are modulated by three liquid crystal panels 310S, 310G, and 310B, and they are synthesized by means of the dichroic prism 400 and the synthesize beam is projected through the projection lens 420 onto the screen S.

The illumination optical system 100 of this projector 90 separates light that exits from the light source 110 into a plurality of luminous fluxes by means of the first lens array 120, and is gathered in the vicinity of the second lens array 130 so that each luminous flux is compiled by the superimposed lens 150 on the liquid crystal panels 310R, 310G, and 310B. By adopting this type of illumination optical system 100, illumination distribution can be unified within the cross-section of luminous flux that exits the light source 110, making it possible for the liquid crystal panels 310R, 310G, and 310B to be irradiated comparatively uniformly with the illumination of light.

Figure 8:
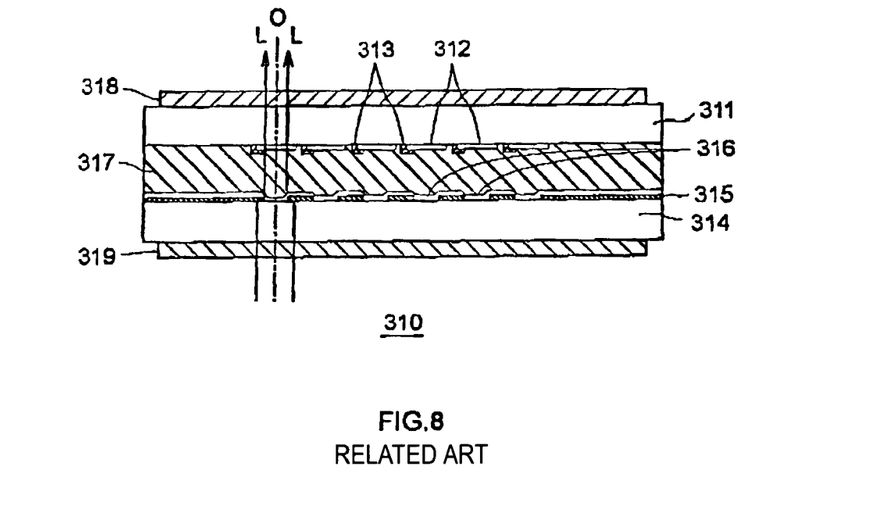
FIG. 8 is a drawing that shows the structure of a liquid crystal light valve.

FIG. 8 is a diagram showing the cross-sectional structure of the liquid crystal panel used for the liquid crystal panels 310S, 310G, and 310B. As shown in FIG. 8, the liquid crystal panel 310 has a structure where the liquid crystal layer 317 is arranged in the gap between a TFT substrate 311 where a picture element electrode 312 and TFT element 313 are arranged on the surface, and an opposing substrate 314 where a black matrix 315 and a common electrode 316 are arranged on the surface. Further, polarizing plates 318 and 319 are attached to the other surface of the TFT substrate 311 and the other surface of the opposing substrate 314.

The liquid crystal panel 310 can control transmittance in each picture element for the incident light L that enters from the opposing substrate 314 side by controlling the voltage applied between the picture element electrodes 312 and the common electrodes 316 for each picture element by means of the operation of the TFT element 313. However, by the operation of the black matrix 315, the unnecessary leakage of light from parts other than the picture elements can be prevented. Therefore, the liquid crystal panel 310 can function as a light valve with high contrast.

Accordingly, a projector having a high contrast with superior display quality is achieved by using this type of liquid crystal panel 310 that is a high contrast light valve as three liquid crystal panels 310S, 310G, and 310B of the projector 90.

Figure 9:
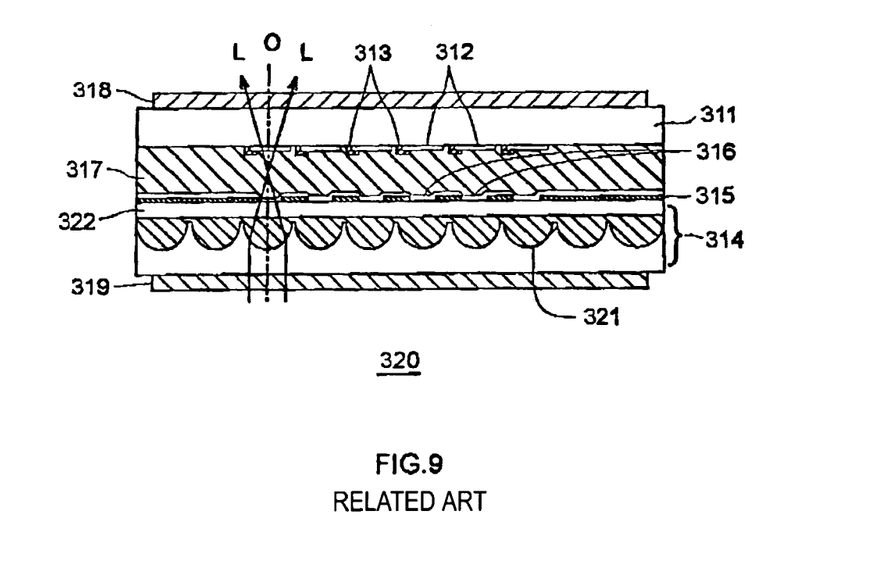
FIG. 9 is a drawing that shows the structure of a liquid crystal light valve.

In recent years, liquid crystal panels with increased light utilization efficiency have been realized by effectively using light that is interrupted by the black matrix. In FIG. 9, a cross-sectional structure of this type of liquid crystal panel is shown. As shown in FIG. 9, the liquid crystal panel 320 has basically the same structure as the liquid crystal panel 310 shown in FIG. 8, with the difference that a micro lens 321 is formed on the opposing substrate 314. Therefore, since the liquid crystal panel 320 has the ability to effectively utilize light interrupted by the black matrix through the operation of the micro lens 321, to increase the luminance of the projector in which the liquid crystal panel 320 as is used for the three liquid crystal panels can be improved.

However, the demand is increasing for projectors with further improvements to the color reproducibility (color matching) of the image displayed on a screen.

An object of the present invention is to further improve the color reproducibility of the image displayed on a screen with a projector.

DISCLOSURE OF THE INVENTION (1) The projector of the present invention includes:
a light source,
a color separating optical system that separates the light from the light source into a plurality of colored light beams,
a plurality of liquid crystal panels for respectively modulating each of the plurality of colored light beams, and
a projection lens for projecting the light beams modulated by the plurality of liquid crystal panels; wherein
of the liquid crystal panels, only at least one liquid crystal panel modulating the colored light beam having a relatively light intensity are provided with a micro lens.

The inventors of the present invention, in order to further improve the color reproducibility of the image projected onto a screen in a projector, have made the discovery described below through performing earnest research and development on especially projectors having high luminance. In other words, in recent high luminance projectors, a high output light source such as a metal halide lamp and a high voltage mercury lamp has been adopted as the light source. Since these lamps have a high color temperature that differ from the conventional halogen lamps in that the light intensity of red is weak and the light intensity of blue and green is strong. Therefore, especially in recent high luminance projectors, the use of an optical system used with conventional halogen lamps is not enough.

Therefore, according to the projector of the present invention, a liquid crystal panel is made where of the plurality of liquid crystal panels, only one, two or more liquid crystal panels for modulating the colored light having relatively weak light intensity are provided with a micro lens. According to this configuration, since the utilization efficiency for the light within the colored light beam having a relatively weak light intensity is improved, the color balance of the color image is improved, and the color reproducibility (color matching) for the projector as a whole is improved.

The phrase "of the plurality of liquid crystal panels, only one, two or more liquid crystal panels for modulating the colored light beam having a relatively weak light intensity from among the colored light beams are provided with a micro lens" includes, for example, if modulating the light from the light source by separating it into three colored light beams, a case in which "only one liquid crystal panel for modulating the colored light beam having the weakest light intensity is provided with a micro lens," and a case in which "only a liquid crystal panel that modulates the colored light beam having the weakest light intensity, and a liquid crystal panel that modulates the colored light beam having the second weakest light intensity are provided with micro lenses."

Furthermore, in the case of modulating the light from the light source by separating it into 5 colored light beams includes a case in which "only one liquid crystal panel that modulates the colored light beam having the weakest light intensity is provided with a micro lens," a case in which "only a liquid crystal panel that modulates the colored light beam having the weakest light intensity and a liquid crystal panel that modulates the colored light beam having the second weakest light intensity are provided with micro lenses," a case in which "only a liquid crystal panel that modulates the colored light beam having the weakest light intensity, a liquid crystal panel that modulates the colored light beam having the second weakest light intensity, and a liquid crystal panel that modulates the colored light beam having the third weakest light intensity are provided with micro lenses," and a case in which "only a liquid crystal panel that modulates the colored light beam having the weakest light intensity, a liquid crystal panel that modulates the colored light beam having the second weakest light intensity, a liquid crystal panel that modulates the colored light beam having the third weakest light intensity, and a liquid crystal panel that modulates the colored light beam having the fourth weakest light intensity are provided with micro lenses." If the five colored light beams are red, green, blue, cyan, and magenta, it is preferred that the only the liquid crystal panel for the red color and the liquid crystal panel for the magenta color are provided with a micro lens.

(2) The projector of the present invention, includes:
a light source,
a color separating optical system for separating the light from the light source into 3 colored light beams of red, green and blue,
a liquid crystal panel for the red color for modulating the red colored light beam,
a liquid crystal panel for the green color for modulating the green colored light beam,
a liquid crystal panel for the blue color for modulating the blue colored light beam, and
a projection lens which projects the light beams modulated by the three liquid crystal panels, and
wherein of the three liquid crystal panels, only the liquid crystal panel for the red color is provided with a micro lens.

According to the projector of the present invention, the color balance of the color image is improved and the color reproducibility (color matching) of the projector as a whole is improved because a liquid crystal panel is provided where among three liquid crystal panels, only the liquid crystal panel for the red color is provided with a micro lens, and since the light utilization efficiency of the liquid crystal panel is improved only in the colored light beam having the relatively weaker light intensity than those of green light and blue light.

(3) The projector of the present invention, includes:
a light source,
a color separating optical system for separating the light from the light source into 3 colored light beams of red, green and blue,
a liquid crystal panel for the red color for modulating the red colored light beam,
a liquid crystal panel for the green color for modulating the green colored light beam,
a liquid crystal panel for the blue color for modulating the blue colored light beam, and
a projection lens which projects the light beams modulated by the three liquid crystal panels, wherein
among the three liquid crystal panels, only the liquid crystal panel for the red color and the liquid crystal panel for the blue color are provided with a micro lens.

As described above, in a high luminance projector, the intensity of the red light is weaker than those of blue light and green light. However, when comparing blue light with green light together, the light intensity of blue light is weaker than that of green light. For this reason, by making the liquid crystal panel for the blue color to be provided with a micro lens in addition to the liquid crystal panel for the red color, the color balance of the color image is improved and the color reproducibility (color matching) of the projector as a whole is of course improved, because the light utilization efficiency is improved in the colored light beams (red and blue) having the relatively weaker light intensity that that of the green light.

(4) In the projector described in the above mentioned (2) or (3), the effectiveness is especially great in case that the light source is a high voltage mercury lamp. A high voltage mercury lamp has a high color temperature and the emission intensity of green light and blue light is stronger than to the emission intensity of red light.

(5) In the projector described in the above mentioned (2) or (3), it is preferred that the light source be a metal halide lamp. A metal halide lamp also has a high color temperature and the emission intensity of green light and blue light is stronger than the emission intensity of red light.

(6) In the projector described in either (2) or (3) above, the distance from the light source to the liquid crystal panel for the green color can be set to be longer than the distance from the light source to the liquid crystal panel for the red color or the distance from the light source to the liquid crystal panel for the blue color from the light source.

According to this configuration, the color balance of the color image is improved and the color reproducibility (color matching) of the projector as a whole is improved because the utilization efficiency of light is relatively reduced by lengthening the optical path length of the green colored light beam which has the highest light intensity compared to the other colored light beams (red and blue) in a high luminance projector.

(7) In the projector described in either (2) or (3) above, the distance from the light source to the liquid crystal panel for the red color can be set to be longer than the distance from the light source to the liquid crystal panel for the green color or the distance from the light source to liquid crystal panel for the blue color.

In the projector according to either (2) or (3), at times the light utilization efficiency can become too high relative to the colored light beam of red. In this case, the utilization efficiency of light can be relatively lowered slightly by lengthening the optical path length of the colored light beam of red in comparison to the other colored light beams (green and blue). Thus, the color balance of the color image is improved and the color reproducibility (color matching) of the projector is further improved.

(8) In the projector described in either (2) or (3) above, the distance from the light source to the three liquid crystal panels can be set so that the distance to all is equal.

In the projector described in either (2) or (3) above, even in the case of adopting an optical system having equal optical path length where the distance from the light source to all three liquid crystal panels is equal, it still has the efficacy of improving the color reproducibility (color matching) of the projector.

(9) In the projector described in either (2) or (3) above, it is also preferred that reflection prevention film is formed in all interfaces with the air of optical elements that exist within the optical path for the red colored light beam from the color separating optical system to the projection lens, and reflection prevention coating is not formed in at least one interface with the air of optical elements that exist within the optical path for the blue colored light beam from the color separating, optical system to the projection lens, and reflection prevention film is not formed in at least one interface with the air of optical elements that exist within the optical path for the green colored light beam from the color separating optical system to the projection lens.

According to this type of construction, while reducing the reflection loss regarding the colored light beam of red having the lowest light intensity in a high luminance projector, the color balance of the color image is improved and the color reproducibility (color matching) of the projector as a whole is improved by not reducing the reflection loss relative to the other colored light beams (green and blue) which have a relatively stronger light intensity.

(10) In the projector described in either (2) or (3) above, it is also preferred that reflection prevention film is formed in all interfaces with the air of optical elements that exist within the optical path for the red colored light beam from the color separating optical system to the projection lens, reflection prevention film is formed in at least one interface with the air of optical elements that exist within the optical path for the blue colored light beam from the color separating optical system to the projection lens, and also reflection prevention film is not formed in at least one interface with the air of optical elements that exist within the optical path for the green colored light beam from the color separating optical system to the projection lens.

According to this type of construction, while not reducing reflection loss relative to the colored light beam of green having the highest light intensity in a high luminance projector, the color balance of the color image is improved and the color reproducibility (color matching) of the projector as a whole are improved by reducing the reflection loss relative to the other colored light beams (green [sic] and blue) which have a relatively weaker light intensity.

In the projector described in either (9) or (10) above, a field lens, an incidence side polarizing plate, a liquid crystal panel, an exit side polarizing plate, a color synthesizing optical system, various types of filters, and lenses and reflecting mirrors constituting a relay optical system, and so forth, can be given as examples of the optical elements that exist within the optical path for each colored light beam from the color separating optical system to the projection lens.

Further, the incidence surface of a field lens,
the exiting surface of the field lens,
the incidence surface of an incidence side polarizing plate,
the exiting surface of the incidence side polarizing plate,
the incidence surface of a liquid crystal panel,
the exiting surface of the liquid crystal panel,
the incidence surface of an exit side polarizing plate,
the exiting surface of the exit side polarizing plate,
the incidence surface of a color synthesizing optical system, the incidence surfaces of various types of filters, the exiting surfaces of the various types of filters, and the incidence surfaces, exiting surfaces, reflecting planes of lenses and reflecting mirrors which constitute a relay optical system, and so forth, can be given as examples of at least one interface among the interfaces with the air and these optical elements.

BEST MODE FOR IMPLEMENTING THE INVENTION

Next, a description of the Embodiment of the present invention will be given. In addition, in the following explanation, and especially where there is no other explanation, the z direction is the advancing direction of the light, the x direction is the three o'clock direction and the y direction is the 12 o'clock direction as seen from the advancing direction of the light (z direction).

Embodiment 1

Figure 1:
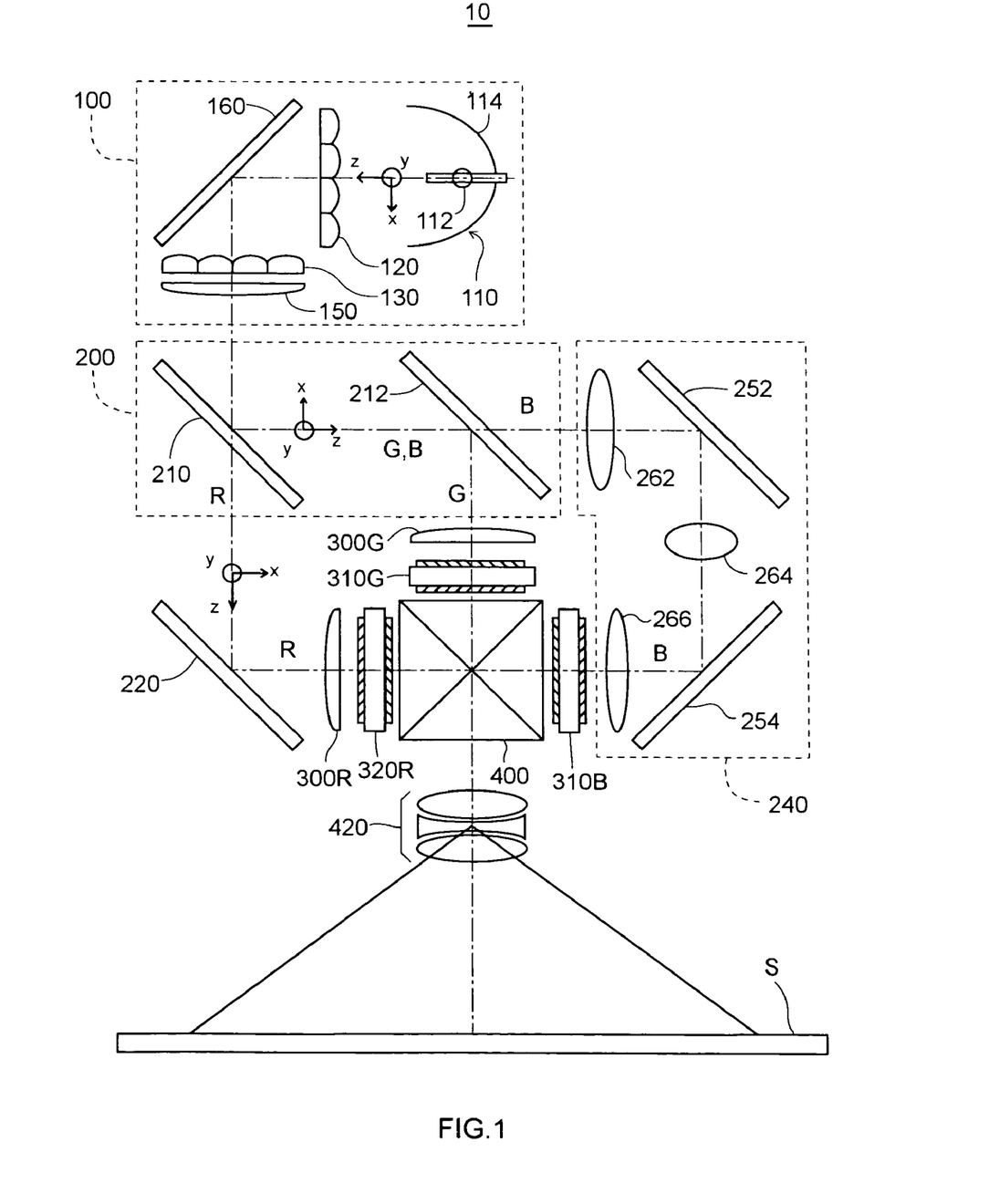
FIG. 1 is a drawing that shows the optical system of the projector according to Embodiment 1 of the present invention.

FIG. 1 is a drawing that shows the optical system of the projector according to Embodiment 1 of the present invention. This projector 10 includes an illumination optical system 100, a color separating optical system 200, a relay optical system 240, a reflecting mirror 220, two field lenses 300R and 300G, three liquid crystal panels 320R, 310G and 310B, a dichroic prism 400 (a color synthesizing optical system), and a projection lens system 420.

The illumination optical system 100 includes a light source 110 emitting nearly parallel luminous fluxes, a first lens array 120, a second lens array 130, a superimposed lens 150, and a reflecting mirror 160. The illumination optical system 100 is an integration optical system for substantially uniformly illuminating the effective area of the liquid crystal panels 320R, 310G, and 310B that is the illumination area.

The light source 110 has a light source lamp 112 as an irradiating light source for emitting a light beam in an irradiated state, and it has a concave mirror 114 which emits irradiated light that is emitted from the light source lamp 112 as substantially parallel luminous fluxes. A high voltage mercury lamp having a high degree of luminance is used as the light source lamp 112.

Figure 2:
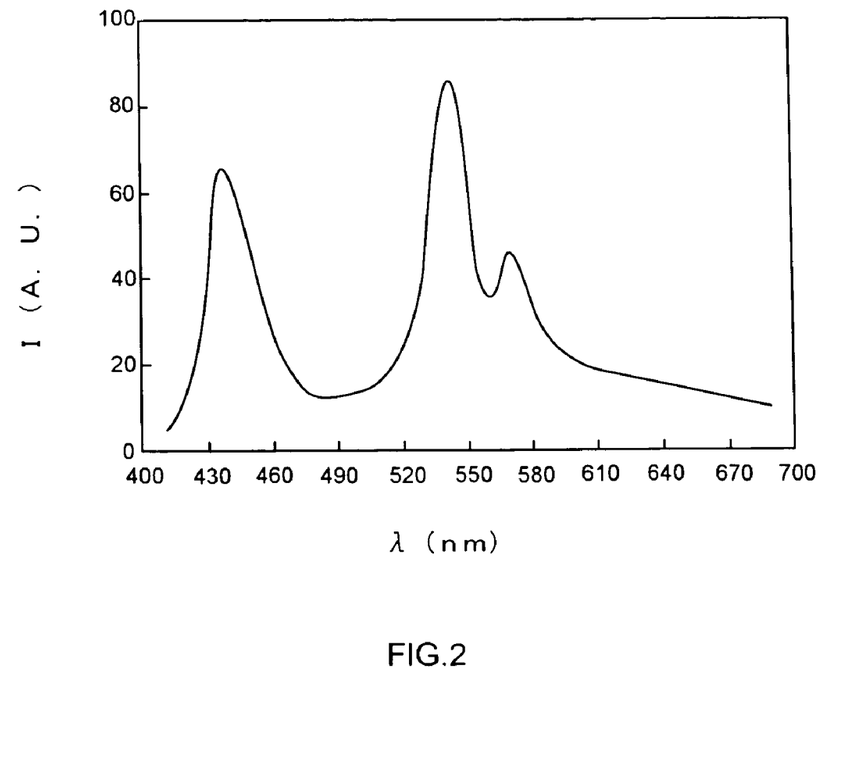
FIG. 2 is a drawing that shows the light intensity spectrum of the light source lamp used in the projector according to Embodiment 1 of the present invention.

FIG. 2 is a drawing that shows the light intensity spectrum of the light source lamp 112. The abscissa indicates the wavelength (λ), and the ordinate indicates the light intensity (I). The high voltage mercury lamp has the color temperature set to be high so as to raise the luminance, and therefore, the light intensity in the blue and green regions is higher than the light intensity in the red region.

Figure 3:
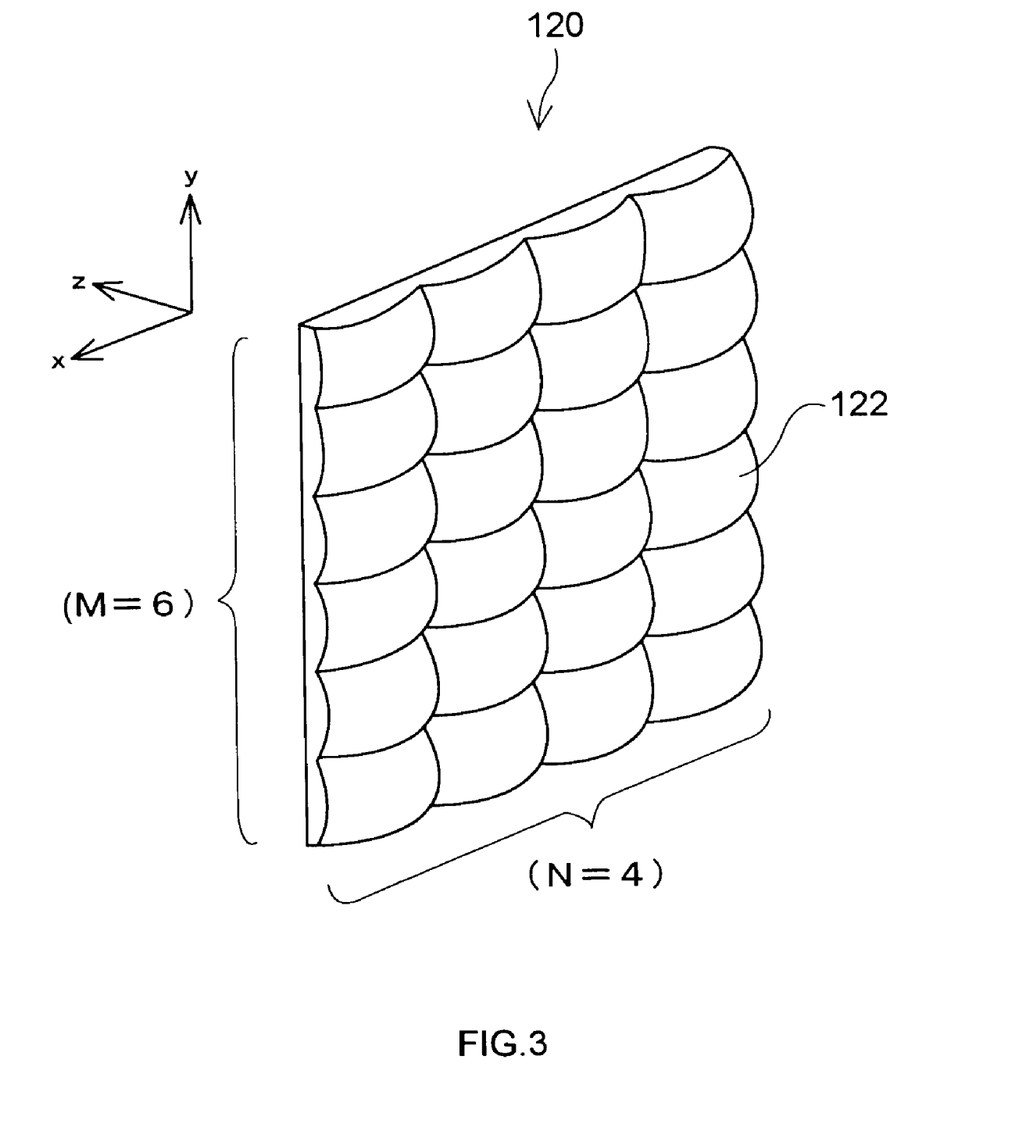
FIG. 3 is an oblique view drawing that shows the external view of the first lens array used in the projector according to Embodiment 1 of the present invention.

FIG. 3 is a oblique view drawing that shows the external view of the first lens array 120. The first lens array 120 has a structure where small lenses 122 having a substantially square shaped contour are arranged in a matrix of M rows and N columns. In this example, M=6 and N=4. Each small lens 122 separates the parallel luminous flux that enters from the light source 110 (FIG. 1) into a plurality of (i.e. M×N number of) partial luminous fluxes then converges each partial luminous flux in the vicinity of the second lens array 130. The outer shape of each small lens 122 as seen from the z direction is established so as to be substantially similar in shape to the shape of the liquid crystal panel 320R, 310G, and 310B. For example, if the aspect ratio (the ratio of the horizontal to vertical dimensions) of the illumination area of the liquid crystal panel (the area where the image is displayed) is 4:3, then the aspect ratio of each small lens 122 is set to 4:3 as well.

The second lens array 130 has a configuration where small lenses are arranged in a matrix shape of M rows and N column so as to correspond with the small lenses of the first lens array 120. The second lens array 130 is constructed so that the center axis (primary light beam) of each partial luminous flux that is emitted from the first lens array 120 orthogonally enters the incidence surface of the superimposed lens 150.

The superimposed lens 150 shown in FIG. 1 has the function of compiling the plurality of partial luminous fluxes into the three liquid crystal panels 320R, 310G, and 310B. Moreover, with Embodiment 1, although the second lens array 130 and the superimposed lens 150 have different constructions, the construction may be made such that the second lens array 130 may also has the function of the superimposed lens 150.

The second lens array 130, as shown in FIG. 1, is arranged at a 90 degree oblique to the first lens array 130 with the reflecting mirror 160 therebetween. The reflecting mirror 160 is arranged so as to guide the luminous fluxes that are emitted from the first lens array 120 into the second lens array 130. Depending on the structure of the illumination optical system, this is not absolutely necessary. For instance, the first lens array 120 and the light source 110 can also be arranged in parallel to the second lens array 130.

In the projector 10 shown in FIG. 1, the substantially parallel luminous fluxes that are emitted from the light source 110 are separated into a plurality of partial luminous fluxes by the first and second lens arrays 120 and 130 which constitute the integration optical system. The partial luminous fluxes that are emitted from each small lens of the first lens array 120 are gathered so that the light source image (secondary light source image) of the light source 110 can be formed in the vicinity of each small lens of the second lens array 130. The partial luminous fluxes that are emitted from the secondary light source image that are formed in the vicinity of the second lens array 130 are compiled on the effective area (the area used for display) of the liquid crystal panels 320R, 310G, and 310B with the superimposed lens 150. As a result of the above, each of the liquid crystal panels 320R, 310G and 310B are substantially uniformly illuminated.

The color separating optical system 200 provides two dichroic mirrors 210 and 212, and has the function of separating the light that is emitted from the superimposed lens 150 into three colored light beams of red, green and blue. The first dichroic mirror 210 reflects the blue color component and the green color component while transmitting the red color component of the luminous flux that was emitted from the illumination optical system 100. The red colored light beam that passed through the first dichroic mirror 210 is reflected by the reflecting mirror 220 and after passing through the field lens 300R, arrives at the liquid crystal light bulb 320R for red light.

Of the blue colored light beam and green colored light beam that was reflected by the first dichroic mirror 210, the green colored light beam is reflected by the second dichroic mirror 212 and after passing through the field lens 300G arrives at the liquid crystal panel 310G for green colored light beam.

Meanwhile, the blue colored light beam is transmitted through the second dichroic mirror 212 and then passes through the relay optical system 240 which includes the incidence side lens 262, the reflecting mirror 252, the relay lens 262, the reflecting mirror 254, and the field lens 266 before arriving at the liquid crystal panel 310B for blue colored light beam. In addition, the reason why the relay lens system is used in the blue colored light beam is to prevent the reduction of the utilization efficiency of light due to light diffusion and so forth, because the length of the optical path for the blue colored light beam is longer than the length of the optical path for the other colored light beams. In other words, it is for conveying the partial luminous fluxes that enter into the incidence side lens 262 to the field lens 254 as is.

The liquid crystal panels 320R, 310G, and 310B modulate the output light intensity for each colored light beam according to the given image information (image signal).

The dichroic prism 400 has the function of a color synthesizing optical system for forming the color image by synthesizing the three colored light beams. A dielectric multi-layered film for reflecting red colored light beam and a dielectric multi-layered film for reflecting blue colored light beam is formed on the dichroic prism 400 substantially in the shape of an X at the interfaces of the four right angle prisms. By the wavelength selective properties of the colored light beam reflecting film that is constructed by these dielectric multi-layered films, the three colored light beams are synthesized to form a synthesized light for projecting a color image.

The synthesized light generated by the dichroic prism 400 is guided to the projection lens 420. The projection lens 420 has the function of a projection means for displaying the color image by projecting the synthesized light onto a screen.

The projector 10 according to Embodiment 1 has the distinctive feature in the composition of the liquid crystal panel. In other words, the liquid crystal panel 320 for the red color is the liquid crystal panel that is provided with the micro lens as shown in FIG. 9. On the other hand, the liquid crystal panel 310G for the green color and the liquid crystal panel 310B for the blue color are liquid crystal panels that are not provided with a micro lens as shown in FIG. 8. Therefore, since the light utilization efficiency of the liquid crystal panel is improved for only the colored light beam that has the relative weaker light intensity than those of green color and blue color, the color balance of the color image is improved and the color reproducibility (color matching) of the projector as a whole is improved.

Embodiment 2

Figure 4:
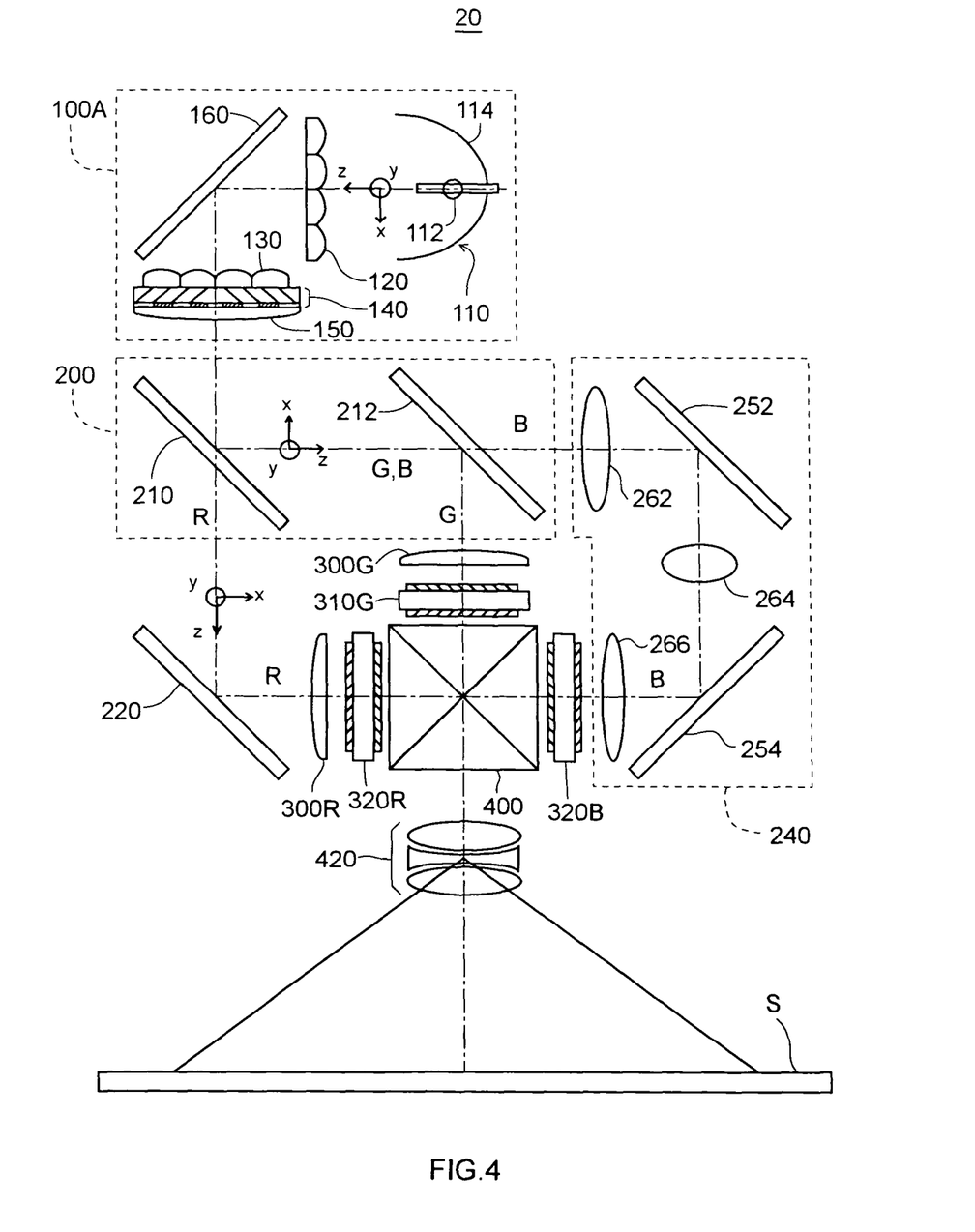
FIG. 4 is a drawing that shows the optical system of the projector according to Embodiment 2 of the present invention.

FIG. 4 is a drawing that shows the optical system of the projector according to Embodiment 2 of the present invention. This projector 20 includes an illumination optical system 100A, a color separating optical system 200, a relay optical system 240, a reflecting mirror 220, two field lenses 300R and 300G, three liquid crystal panels 320R, 310G and 320B, a dichroic prism 400, and a projection lens system 420.

This projector 20 differs from the projector 10 described above in that the illumination optical system 100A has a polarization conversion element 140 for converting the illuminating light into a substantially single type of polarizing light, and that the liquid crystal panel for the blue color is a liquid crystal panel 320B provided with a micro lens. All other configuration is the same as in the projector 10. Since the constituting parts are the same as in the projector 10, the same reference numerals as those used in FIG. 1 through FIG. 3 are used in explanation of Embodiment 2 and FIG. 4 and therefore the details of the description are omitted.

The illumination optical system 100A includes a light source 110 emitting substantially parallel luminous fluxes, a first lens array 120, a second lens array 130, a polarization conversion element 140, a superimposed lens 150, and a reflecting mirror 160. The illumination optical system 100A is an integration optical system for substantially uniformly illuminating the effective area of the liquid crystal panels 320R, 310G, and 320B that is the illumination area.

The configuration of the light source 110, the first lens array 120, the second lens array 130, and the function of the reflecting mirror 160 is the same as the illumination optical system 100 of projector 10.

Figure 5:
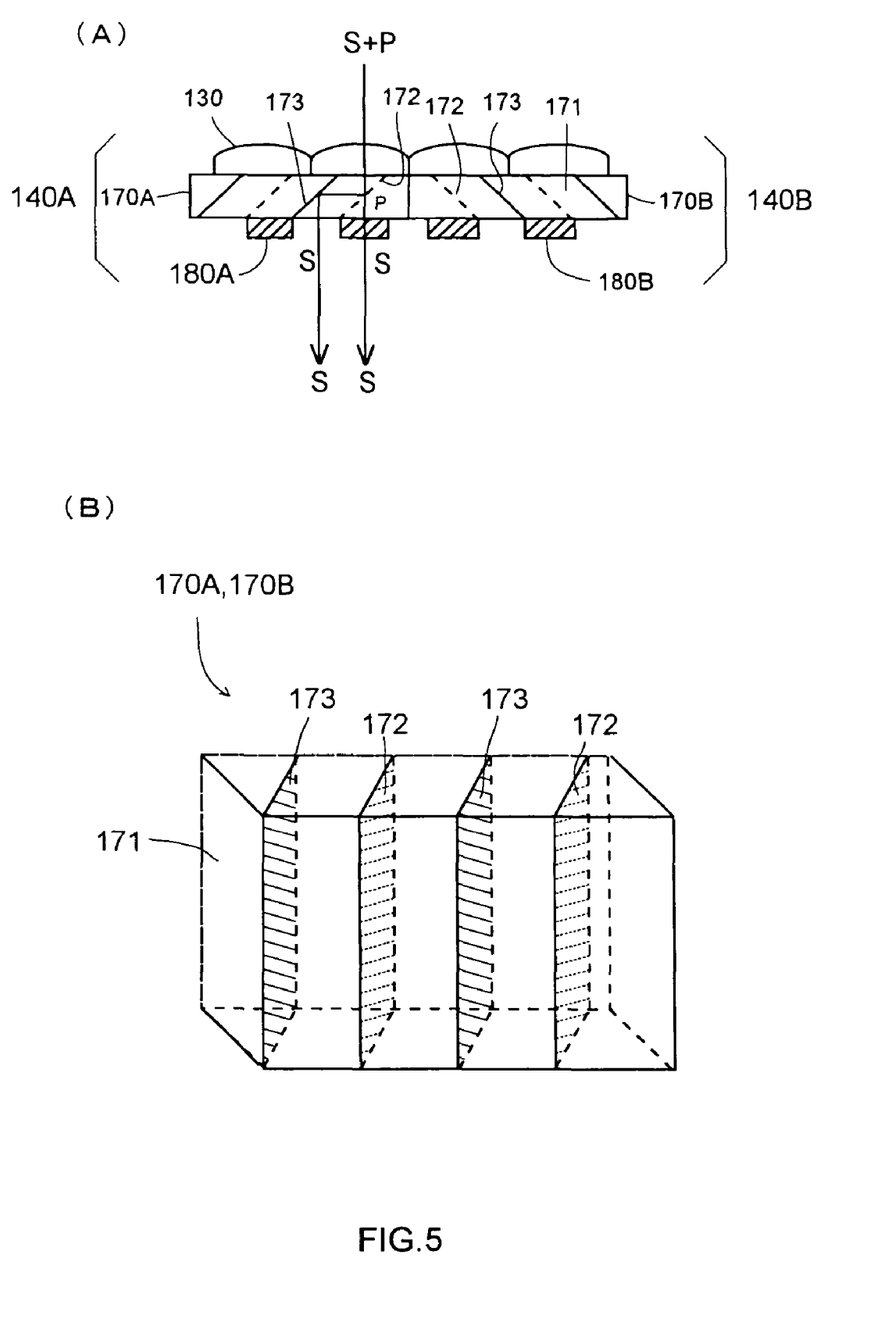
FIG. 5 is a drawing for explaining the construction and function of the polarizing conversion element used in the projector according to Embodiment 2 of the present invention.

FIGS. 5(A) and FIG. 5(B) are drawings for explaining the detailed configuration and function of the polarization conversion element 140. The polarization conversion element 140, as shown in FIG. 5(A), is comprised of two polarization conversion element arrays 140A and 140B that are arranged in a symmetrical orientation sandwiching the optical axis. These polarization conversion element arrays 140A and 140B are provided with polarizing beam splitter arrays 170A and 170B as well as λ/2 phase difference plates 180A and 180B (shown in the drawing by the diagonal lines) being selectively arranged on one part of the light exiting surface. The polarizing column-shaped transparent beam splitter arrays 170A and 170B, as shown in FIG. 5(B), have a shape in which the column-shaped transparent members 171 whose cross sectional shape is parallelogram are sequentially laminated to each other. Polarizing beam separating film 172 and reflecting film 173 are alternately formed at the interface planes of the transparent members 171. The λ/2 phase different plates 180A and 180B, as shown in FIG. 5(A), are selectively laminated to the imaging portion of the z direction of the light exiting surface of the polarizing beam separating film 172 and reflecting film 173. With this example, it is applied to the imaging portion in the z direction of the exiting surface of the light of the polarizing beam separating film 172.

A non-polarized light beam (incidence beam having a random polarization direction) that includes the "s" polarized light component and the "p" polarized light component enters into the incidence surface of the polarization conversion element 140 constructed in such a manner.

This incidence light beam beam, as shown by the arrow in FIG. 5(A), first, is separated into the "s" polarized light beam and the "p" polarized light beam by the polarizing beam separating film 172. The "s" polarized light beam is reflected substantially orthogonally by the polarizing beam separating film 172, and after being further reflected by the reflecting film 173, it is ejected. Meanwhile, the "p" polarized light beam is transmitted as is through the polarizing beam separating film 172. The λ/2 phase difference plates 180A and 180B are arranged at the exit plane of the "p" polarized light beam that passed through the polarizing beam separating film, and this "p" polarized light beam is converted into the "s" polarized light beam and exits. Accordingly, most of the light that passed through the polarization conversion element 140 is ejected as an "s" polarized light beam. In other words, the polarization conversion element 140 has the function of converting the light that exits from the lens arrays 120 and 130 into a substantially single type of direct polarized beam (for instance "s" polarized light beam and "p" polarized light beam) and emitting the light. In addition, when desiring to convert the light exiting from the polarization conversion element 140 into "p" polarized light, the λ/2 phase difference plates 180A and 180B can be arranged at the exiting surface from which the "s" polarized light beam reflected by the reflecting film 173 exits.

The superimposed lens 150 has the function of compiling the plurality of partial luminous fluxes that were converted into a substantially single type of polarized light by the polarization conversion element 140, into the three liquid crystal panels 320R, 310G, and 320B.

Since the projector 20 which is provided with this type of illumination optical system 100A has the ability to effectively utilize one of the polarized light components that does not contribute to display in the conventional art, it becomes a projector with high luminance.

Furthermore, since the projector 20 according to Embodiment 2 uses a liquid crystal panel that is provided with a micro lens as shown in FIG. 9 for also the liquid crystal panel 320B for the blue color in addition to the liquid crystal panel 320R for the red color, it improves the light utilization efficiency in the colored light beams (red and blue) that have a relatively weaker light intensity as compared to the green color. For this reason, the projector 20 according to Embodiment 2, in the same manner as with Embodiment 1, improves the color balance of the color picture mage and of course improves the color reproducibility (color matching) of the projector as a whole.

In addition, while both Embodiment 1 and Embodiment 2 are constructed so as to make, "the distance from the light source 110 to the liquid crystal panel 320R for the red color" and "the distance from the light source I 10 to the liquid crystal panels 310G and 3206 for the green color" to be the same distance, they are also constructed to make, "the distance from the light source 110 to the liquid crystal panel 310B for the blue color" to be longer as compared to these other two. However, the projector of the present invention is not limited to this construction, and even if the "distance from the light source 110 to the liquid crystal panel 320R for the red color" is constructed so as to be longer as compared to the "distance from the light source 110 to the liquid crystal panels 310B and 320B for the blue color" and the "distance from the light source 110 to the liquid crystal panel 310G for the green color", the color reproducibility (color matching) is still improved, because the light utilization efficiency of the red colored light beam is on occasion relatively too high.

Embodiment 3

Figure 6:
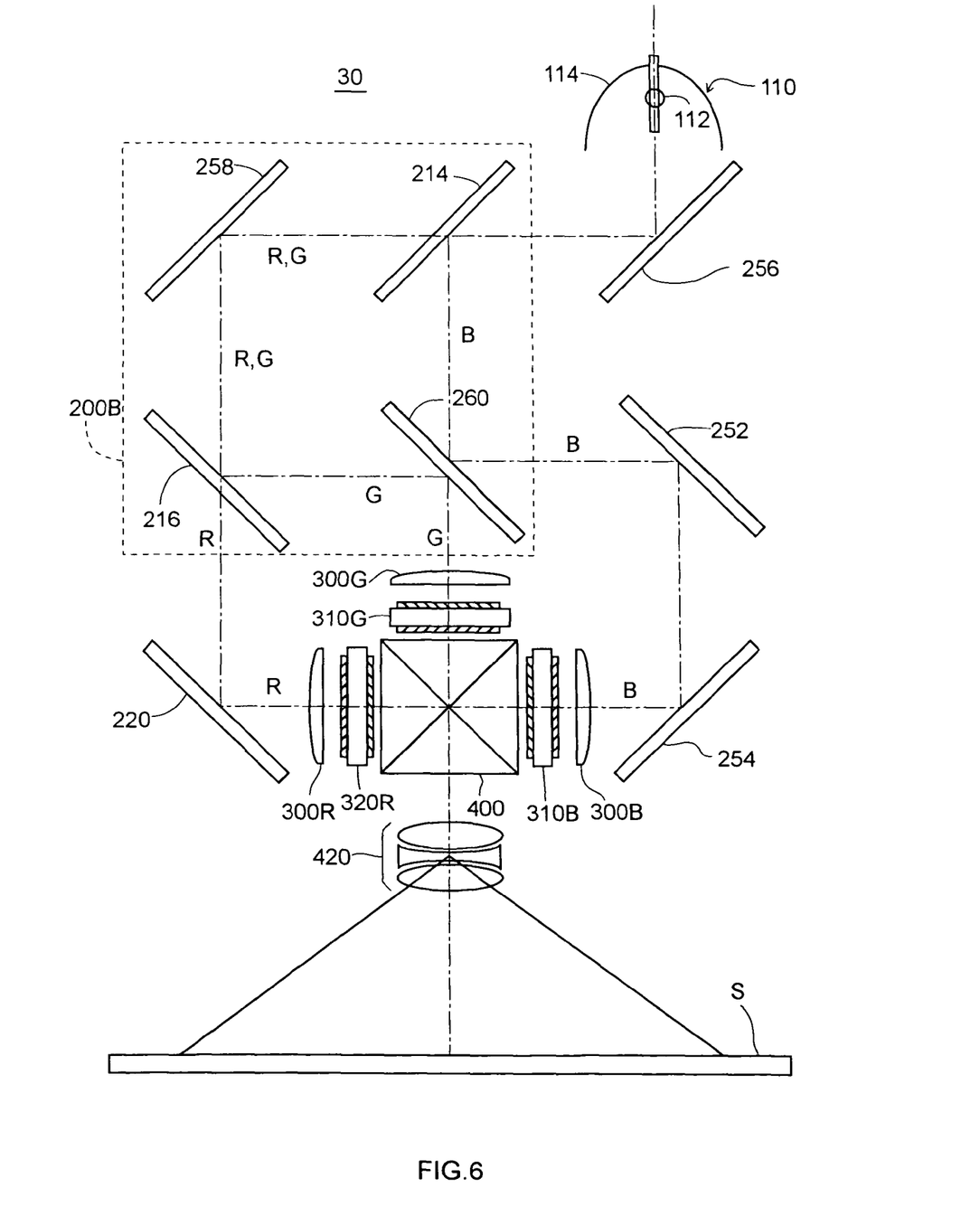
FIG. 6 is a drawing the shows the optical system of the projector according to Embodiment 3 of the present invention.

FIG. 6 is a drawing that shows the optical system of the projector according to Embodiment 3 of the present invention. This projector 30 includes a light source 110, a reflecting mirror 256, a color separating optical system 200B, reflecting mirrors 220, 252, and 254, three field lenses 300R, 300G, and 300B, three liquid crystal panels 320R, 310G and 310B, a dichroic prism 400, and a projection lens 420.

This projector 30 is an optical system having equal optical path where "each distance from the light source to the three liquid crystal panels 320R, 310G and 310B" is equal. In the projector of Embodiment 3, while in this equal optical length optical system, the liquid crystal panel that is provided with the micro lens as shown in FIG. 9 is used for the liquid crystal panel 320R for the red color, the liquid crystal panels that are not provided with the micro lens as shown in FIG. 8 is used for the liquid crystal panel 310G for the green color and the liquid crystal panel 310B for the blue color. In this projector 30, since the light utilization efficiency of the liquid crystal panel is improved for only that colored light beam having a relatively weaker light intensity as compared to the green and blue colors, the color balance of the color image is improved and the color reproducibility (color matching) is improved for the projector as a whole in the same manner as with Embodiment 1 and with Embodiment 2.

Embodiment 4

The projector according to Embodiment 4 of the present invention, although not show in the drawing, has the same optical system as that of projector 10 according to Embodiment 1 shown in FIG. 1. The points wherein the projector according to Embodiment 4 differ from the projector 10 according to Embodiment 1 are explained hereafter.

In other words, in the projector 10 that relates to Embodiment 1, a reflection prevention film composed of a dielectric multi-layered film is formed, from the view point of improving the light utilization efficiency, at the incidence surface of the field lenses 300R, 300G, and 266 for each color, the incidence surface of polarizing plates at the incidence side as well as the exiting surface of the polarizing plates at the exiting side for the liquid crystal panels for each color 320R, 310G, and 310B, and the incidence surface of each colored light beam of the dichroic prism. On the other hand, while a reflection prevention coating composed of a dielectric multi-layered film is also formed to nearly all planes in the projector according to Embodiment 4, a reflection prevention film composed of a dielectric multi-layered film is purposefully not formed to only the incidence surface of the field lens 300G for the green color. When considering the light utilization efficiency, this may be considered unbeneficial, but by so doing, the color balance of the color image and the color reproducibility (color matching) of the projector are further improved.

The plane that purposefully does not have a reflection prevention film composed of a dielectric multi-layered film is not limited to the incidence surface of the field lens for the green color, but also the exit plane of the field lens for the green color, the incidence surface of the polarizing plate at the incidence side of the liquid crystal panel for the green color, and at the exiting surface of the polarizing plate at the exiting side of the liquid crystal panel for the green color are possible as well.

However, projectors that synthesize light that has been modulated by liquid crystal panels for each of the colors through using a dichroic prism for color synthesis then guiding such light to a projection lens are also favorably used in general. In this case, as the plane that purposefully does not use a reflection prevention film composed of a dielectric multi-layered film, the plane where the colored light beam of green enters into the dichroic prism for this color synthesis may be used.

Further, a liquid crystal panel that separates the polarizing plate at the incidence side and the polarizing plate at the exiting side from the liquid crystal panel main body can also preferably be used in general as the liquid crystal panel. In this case, as the plane that purposefully does not use a reflection prevention film composed of a dielectric multi-layered film, the exiting surface of the incidence side of the polarizing plate of the liquid crystal panel for the green color, the incidence surface of the liquid crystal panel for the green color, the exiting surface of the liquid crystal panel for the green color, or the incidence surface of the polarizing plate at the exiting side of the liquid crystal panel for the green color may be used.

Also, varieties of filters and relay optical systems can also be arranged within the optical path for each colored light beam. In this case, as the plane that purposefully does not use a reflection prevention film composed of a dielectric multi-layered film, the incidence surface, exiting surface or reflecting plane of same types of filter and relay optical path that is arranged within the optical path for the green color may be possible.

From among these planes, it is especially preferable that the incidence surface of the field lens for the green color, the exiting surface of the field lens for the green color, or the incidence surface of the polarizing plate at the incidence side of the liquid crystal panel for the green color be used as the plane that purposefully does not use a reflection prevention film composed of a dielectric multi-layered film. This is because when equipping the plane that does not use a reflection prevention film at the exiting side of the liquid crystal panel, the picture quality deterioration more easily occurs due to multiplex reflection of the modulated luminous flux as compared to equipping the plane that does not dispose a reflection prevention film at the incidence side of the liquid crystal panel.

Embodiment 5

The projector according to Embodiment 5 of the present invention, although not shown in the drawing, has the same optical system as that of projector 10 that according to Embodiment 1 shown in FIG. 1. The points wherein the projector according to Embodiment 5 differ from the projector 10 according to Embodiment 1 are explained hereafter.

In other words, in the projector 10 according to Embodiment 1, a reflection prevention film composed of a dielectric multi-layered film is formed, from the view point of improving the light utilization efficiency, at the incidence surface of the field lenses 300R, 300G, and 266 for each color, the incidence surface of the polarizing plates at the incidence side as well as the exiting surface of the polarizing plates at the exiting side of the liquid crystal panels for each color 320R, 310G, and 310B, and the incidence surface of each colored light beam of the dichroic prism. Relative to this, while a reflection prevention film composed of a dielectric multi-layer film is also formed to nearly all planes in the projector according to Embodiment 5, a reflection prevention film composed of a dielectric multi-layered film is purposefully not formed to only the incidence surface of the field lenses 300G and 266 for the green color and blue color. When considering the light utilization efficiency, this may be considered unbeneficial, but by so doing, the color balance of the color image are improved and this leads to further improvement of the color reproducibility (color matching) of the projector.

As the optical elements of purposefully not dispose a reflection prevention film composed of a dielectric multi-layer film, they are not limited to the incidence surface of the field lenses of the green color and the blue color, but also the exit plane of the field lenses for the green color and for the blue color, the incidence surface of the polarizing plate at the incidence side of the liquid crystal panels for the green color and for the blue color, the exiting surface of the polarizing plate at the exiting side for the green color and for the blue color, and the incidence surface for the green color or the incidence surface for the blue color of the dichroic prism may be used as well.

Furthermore, projectors that synthesize light that has been modulated by liquid crystal panels for each of the colored light beams through using a dichroic prism for color synthesis then guiding such light to a projection lens are also favorably used in general. In this case, as the plane that purposefully does not use a reflection prevention film composed of a dielectric multi-layered film, the plane where the colored light beam of green enters into the dichroic prism for this color synthesis or the plane where the colored light beam of blue enters into the dichroic prism for this color synthesis may be used.

Further, a liquid crystal panel having a construction to separate the polarizing plate at the incidence side and the polarizing plate at the exiting side from the liquid crystal panel main body can also preferably be used in general as the liquid crystal panel. In this case, as the plane that purposefully does not dispose a reflection prevention film composed of a dielectric multi-layered film, the exiting surface of the polarizing plate at the incidence side of the liquid crystal panel for the green color or for the blue color, the incidence surface of the liquid crystal panel main body for the green color or for the blue color, the exiting surface of the liquid crystal panel main body for the green color or for the blue color, and the incidence surface of the polarizing plate at the exiting side of the liquid crystal panel for the green color or for the blue color may be used.

Also, varieties of filters and relay optical systems can also be arranged within the optical path for each colored light beam. In this case, as the plane that purposefully does not use a reflection prevention film composed of a dielectric multi-layered film, the incidence surface, exiting surface or reflecting plane of various types of filter and relay optical system that is arranged within the optical path for the green color or for the blue color may be used.

From among these planes, it is especially preferable that the incidence surface of the field lens for the green color or for the blue color, the exiting surface of the field lens for the green color or for the blue color, or the incidence surface of the polarizing plate at the incidence side of the liquid crystal panel for the green color or for the blue color be used as the plane that purposefully does not use a reflection prevention film composed of a dielectric multi-layer film. This is because when equipping the plane that does not use a reflection prevention film to the exiting side of the liquid crystal panel, the picture quality deterioration more easily occurs due to multiplex reflection of the modulated luminous flux as compared to equipping the plane that does not dispose a reflection prevention coating at the incidence side of the liquid crystal panel.

AVAILABILITY IN INDUSTRIAL USE

According to the projector of the present invention, since the color balance of the color image is improved and the color reproducibility (color matching) as a whole is improved, the projector of the present invention is suitable for use as a projector for projecting a color image onto a projection surface such as a screen.

The invention claimed is:

1. A projector, comprising:
   a light source;
   a color separating optical system to separate the light from the light source into three colored light beams of red, green and blue;
   a liquid crystal panel for the red color to modulate the red colored light beam;
   a liquid crystal panel for the green color to modulate the green colored light beam;
   a liquid crystal panel for the blue color to modulate the blue colored light beam; and
   a projection lens which projects the light beams modulated by the three liquid crystal panels;
   only the liquid crystal panel for the red color and the liquid crystal panel for the blue color being provided with a micro lens array.

2. The projector according to claim 1, the distance from the light source to the liquid crystal panel for the red color being longer than the distance from the light source to the liquid crystal panel for the green color or the distance from the light source to the liquid crystal panel for the blue color.

3. The projector according to claim 1, the distances from the light source to the three liquid crystal panels being equal.

4. The projector according to claim 1, a reflection prevention film being formed in all interfaces with the air of optical elements that exist within the optical path for the red colored light beam from the color separating optical system to the projection lens;
   a reflection prevention film being not formed in at least one interface with the air of these optical elements that exist within the optical path for the blue colored light beam from the color separating optical system to the projection lens; and
   a reflection prevention film being not formed in at least one interface with the air of these optical elements that exist within the optical path for the green colored light beam from the color separating optical system to the projection lens.

5. The projector according to claim 1, a reflection prevention film being formed in all interfaces with the air of optical elements that exist within the optical path for the red colored light beam from the color separating optical system to the projection lens;
   a reflection prevention film being formed in at least one interface with the air of these optical elements that exist within the optical path for the blue colored light beam from the color separating optical system to the projection lens; and
   a reflection prevention film being not formed in at least interface with the air of these optical elements that exist within the optical path for the green colored light beam from the color separating optical system to the projection lens.

6. A projector, comprising:
   a light source;
   a color separating optical system to separate the light from the light source into three colored light beams of red, green and blue;

a liquid crystal panel for the red color to modulate the red colored light beam;

a liquid crystal panel for the green color to modulate the green colored light beam;

a liquid crystal panel for the blue color to modulate the blue colored light beam; and a projection lens which projects the light beams modulated by the three liquid crystal panels;

only the liquid crystal panel for the red color being provided with a micro lens array, the distances from the light source to the three liquid crystal panels being equal.

7. A projector, comprising:

a light source;

a color separating optical system to separate the light from the light source into three colored light beams of red, green and blue;

a liquid crystal panel for the red color to modulate the red colored light beam;

a liquid crystal panel for the green color to modulate the green colored light beam;

a liquid crystal panel for the blue color to modulate the blue colored light beam; and a projection lens which projects the light beams modulated by the three liquid crystal panels;

only the liquid crystal panel for the red color being provided with a micro lens array, a reflection prevention film being formed in all interfaces with the air of optical elements that exist within the optical path for the red colored light beam from the color separating optical system to the projection lens;

a reflection prevention film being not formed in at least one interface with the air of these optical elements that exist within the optical path for the blue colored light beam from the color separating optical system to the projection lens; and a reflection prevention film being not formed in at least one interface with the air of these optical elements that exist within the optical path for the green colored light beam from the color separating optical system to the projection lens.

8. A projector, comprising:

a light source;

a color separating optical system to separate the light from the light source into three colored light beams of red, green and blue;

a liquid crystal panel for the red color to modulate the red colored light beam;

a liquid crystal panel for the green color to modulate the green colored light beam;

a liquid crystal panel for the blue color to modulate the blue colored light beam; and a projection lens which projects the light beams modulated by the three liquid crystal panels;

only the liquid crystal panel for the red color being provided with a micro lens array, a reflection prevention film being formed in all interfaces with the air of optical elements that exist within the optical path for the red colored light beam from the color separating optical system to the projection lens;

a reflection prevention film being formed in at least one interface with the air of these optical elements that exist within the optical path for the blue colored light beam from the color separating optical system to the projection lens; and a reflection prevention film being not formed in at least interface with the air of these optical elements that exist within the optical path for the green colored light beam from the color separating optical system to the projection lens.

9. A projector, comprising:

a light source;

a color separating optical system that separates light from the light source into three colored light beams of red, green and blue;

a first liquid crystal panel to modulate the colored light beam of red, the first liquid crystal panel having a micro lens array;

a second liquid crystal panel to modulate the colored light beam of blue, the second liquid crystal panel having a micro lens array;

a third liquid crystal panel to modulate the colored light beam of green, the third liquid crystal panel not having a micro lens array; and a projection lens to project the light beams modulated by the first, second, and third liquid crystal panels.

* * * * *